Jan. 6, 1925.  
V. A. BOKER  
LINE DRIVE FOR TRACTORS  
Filed July 3, 1918  
1,522,094  
2 Sheets-Sheet 1
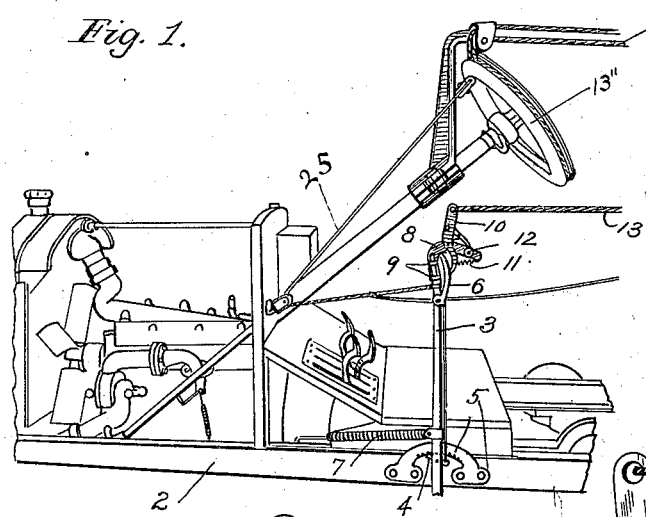
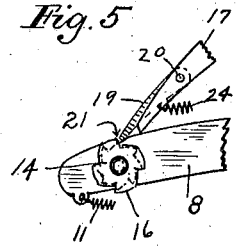
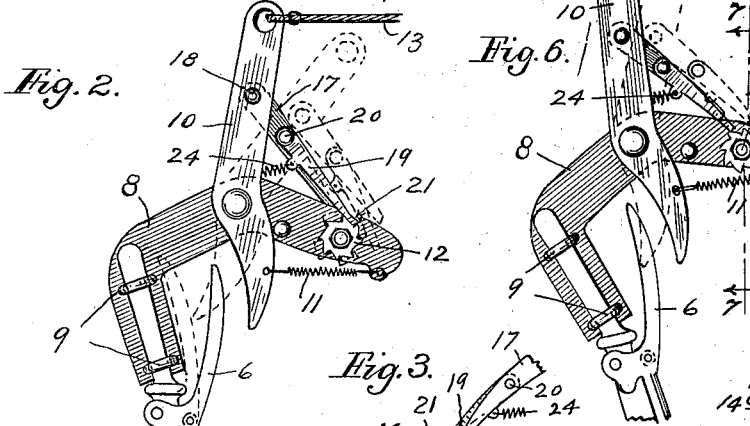
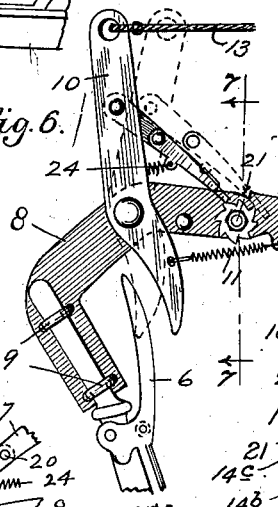
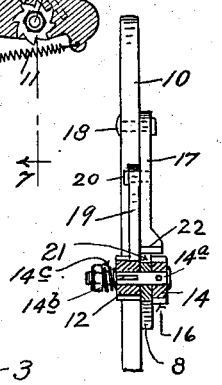
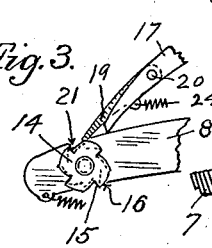
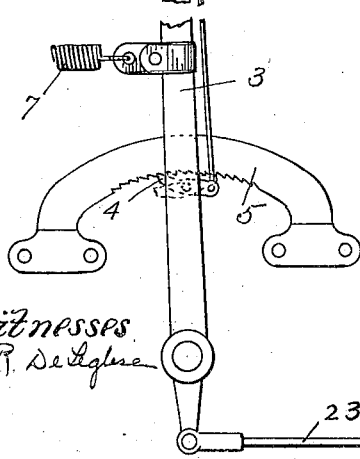
Inventor  
VITUS A. BOKER  
By his Attorneys

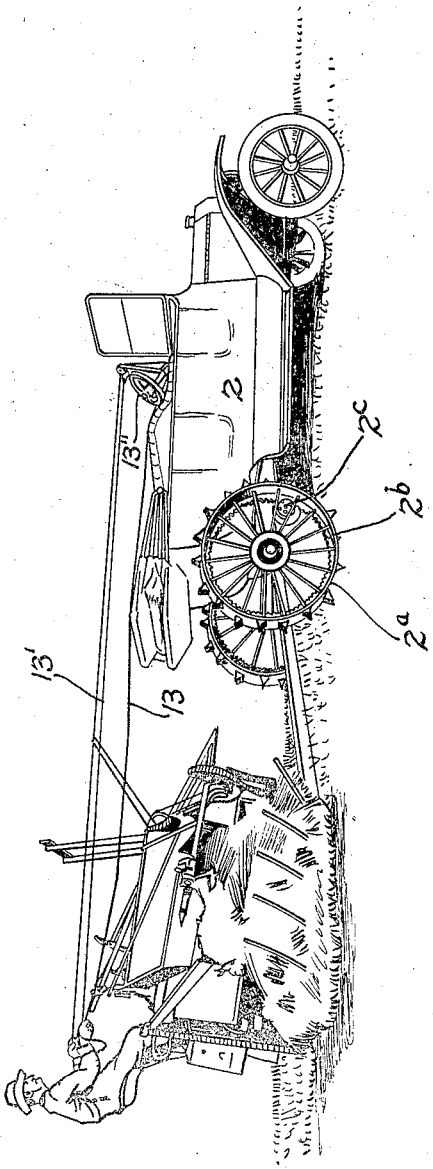

Patented Jan. 6, 1925.

1,522,094

UNITED STATES PATENT OFFICE.

VITUS A. BOKER, OF MINNEAPOLIS, MINNESOTA, ASSIGNOR TO THE E. G. STAUDE MANUFACTURING COMPANY, OF ST. PAUL, MINNESOTA, A CORPORATION.

LINE DRIVE FOR TRACTORS.

Application filed July 3, 1918. Serial No. 243,148.

*To all whom it may concern:*

Be it known that I, VITUS A. BOKER, a citizen of the United States, resident of Minneapolis, county of Hennepin, State of Minnesota, have invented certain new and useful Improvements in Line Drives for Tractors, of which the following is a specification.

In a line drive attachment for tractors, in addition to the steering attachment for the machine it is necessary to provide some means for shifting the control lever forward and backward to start or stop the car.

The object of my invention is to provide a device in connection with the control lever so that the driver in the rear of the machine by means of a cord or line, can shift the control lever from neutral to high and vice versa without the necessity of grasping a lever with the hand.

A further object is to provide a line drive attachment for a control lever which can be easily and quickly attached to the hand grip of the control lever without any change in the lever or its connections.

The invention consists generally in various constructions and combinations, all as hereinafter described and particularly pointed out in the claims.

In the accompanying drawings forming part of this specification,

Figure 1 is a view of the forward portion of an automobile, showing my invention applied to the control lever, Figure 2 is a detail view of the control lever with my invention mounted thereon, the lever being in neutral position, Figure 3 is a detail view, showing the ratchet wheel in position to allow the operating dog to engage the lever bracket for moving the control lever from high to neutral, Figure 4 is a similar view, showing the ratchet wheel in position to guide the dog out of engagement with the notch in the lever bracket, Figure 5 is a view of the opposite side of the bracket from the view shown in Figure 3, Figure 6 is a view corresponding to Figure 2, but showing the control lever in its high-speed position, Figure 7 is an edge view of the control lever attachment, partially in section, showing the manner of mounting the ratchet device thereon, Figure 8 is a view illustrating the manner of using the device.

In the drawing, 2 represents a car, tractor or other vehicle, having the control lever 3, provided with a locking latch 4 to engage the teeth of a bar 5. A latch lever 6 is mounted on the upper end of the lever 3 and connected with the latch 4 for disengaging it from the teeth of the bar whenever it is desired to move the control lever forward to start the car. A spring 7 is provided to throw the lever forward into its high-speed position when the latch is released. A bracket 8 is secured by clamps 9 to the hand grip of the lever. This bracket 8 extends backwardly over the latch lever 6 and a lever 10 is mounted on the extension 8 above the latch lever and has its lower end in position to contact therewith and trip the latch when the upper end of the lever 10 is thrown backward. A spring 11 is attached to the lower portion of the lever 10 and to the rear end of the bracket 8 for returning the lever to its normal position after it has been operated to trip the latch lever. The upper end of the lever 10 has a line 13 connected thereto and extending back of the machine so that a person walking or riding in the rear can shift the controlling mechanism without the necessity of applying the hand directly to the control lever.

The bracket 8 is provided with a ratchet wheel 12 on one side and a second wheel 14 is mounted on the other side of the extension and has teeth 15 provided with cam surfaces 16. The ratchet wheel 14 is securely fastened to the pin $14^a$ which extends through the bracket 8 and is provided with a key $14^b$ upon which is slidably mounted the ratchet wheel 12. The pin also is provided with a nut and spring $14^c$. By this means the proper amount of friction may be given to hold the ratchet in an operative position and will only be moved by the action of the lever 19.

A dog 17 is pivoted at 18 on the lever 10 and a second dog 19 is pivoted at 20 on the dog 17 and is provided with a spring 24 which holds the dogs 17 and 19 in engagement with the ratchet wheels 12 and 14. The dog 19 engages the teeth of the wheel 12 and the bracket 8 has a notch 21 therein to receive the dog 17 which has a long bearing face 22 to project beyond the edge of the bracket 8 into the path of the cam surfaces 16 of the teeth 15 and the wheel 14 is so mounted that at regular intervals in its revolution the dog 17 will be lifted and held out of engagement with the notch 21 and when so held it will slip over the notch, as shown in Figure 4, and the lever 10 may be swung backward without changing the position of the control lever. The ratio of the number of teeth in the wheels 12 and 14 is two to one. The dog 19 will actuate the wheel 12 with each backward stroke of the lever 10 but this movement will be ineffective to change the position of the control lever from high to neutral unless the dog 17 engages the notch 21 and the movement of the wheels is so timed that this engagement will occur with every other stroke of the lever. That is, on one movement the dog 19 will actuate the wheel 12 and move the wheel 14 a step to either allow the dog 17 to drop into the notch 21 or position one of the cam surfaces 16 so that the dog 17 will be held out of engagement with this notch and will slide on the surface of the tooth until the further movement of the wheel 12 changes the position of the wheel 14 and allows the dog 17 to again enter its notch 21, as shown in Figure 5. This arrangement allows me to carry out mechanically the hand operation of the latch and control lever. For instance, assuming that the parts are in the position shown in Figure 2, with the control lever in its neutral position, and the operator wishes to start the machine, he will pull on the line 13 connected with the lever 10 and trip the lever latch 6, disengaging the latch 4 from the toothed bar, as shown by dotted lines, and thereupon the spring 7 will throw the control lever to its high speed position, as shown in Figure 6. The machine will then move forward, the operator controlling its movement through the line guide connection 13' with the steering wheel 13". When he wishes to stop the machine, he will pull again on the line, swinging the lever 10 backward, and as the toothed wheels will have been previously set in proper position to allow the dog 17 to enter the notch 21, as indicated by dotted lines in Figure 6, the control lever will swing backward from the high speed to the neutral position, the latch 4 sliding over the teeth of the bar 5, and at the same time, if desired, the brake rod 23 connected to the lower end of the control lever 3, will set the brake. In this way the driver of the car will have perfect control of the starting or stopping of it without actually grasping the control lever or its connections with the hand.

As shown in Figure 1, I may provide a flexible connection 25 between the control lever and the throttle on the steering wheel 13" so that when the control lever is moved to its neutral position the throttle will be closed.

In Figure 8, I have illustrated the device applied to a car tractor used for drawing a harvester. The rear wheels of the car are removed and the large traction wheels 2ª substituted therefor. Each wheel is provided with an internal gear ring 2ᵇ, and pinions 2ᶜ connected with the source of motive power of the machine mesh with the rings 2ᵇ and drive the traction wheels in substantially the same manner as the power is applied to the traction wheels of an ordinary tractor. The driver seated on the harvester in the rear is able to have complete control of the motive power through the control mechanism heretofore described.

I claim as my invention:

1. The combination, with a control lever having a locking latch and a latch lever connected therewith, a toothed bar for said latch and a spring for normally throwing said control lever to the high speed position, of a trip lever mounted on said control lever and having a flexible connection extending rearwardly and positioned to engage and trip said latch lever upon the initial pull of said flexible connection to allow the control lever spring to throw it to its high speed position, and means connected with said trip lever and engaging said control lever for temporarily locking said trip lever to throw said control lever to its neutral position upon the second pull of said flexible connection.

2. The combination, with a control lever, its locking latch and lever connected therewith, a toothed bar engaged by said latch and a spring normally tending to throw said lever forward, of a trip lever mounted on said control lever to engage and trip said latch lever, a line connected with said trip lever and a ratchet mechanism interposed between said trip lever and said control lever for allowing said trip lever to swing independently of said control lever on the initial pull of said line to trip said latch lever and lock said trip lever on the second pull of said line to move said control lever.

3. The combination, with a control lever, its locking latch and lever connected therewith, a toothed bar engaged by said latch and a spring normally tending to throw said control lever forward, of a trip lever mounted on said control lever to engage and trip said latch lever, a line connected with said trip lever, a ratchet mechanism comprising toothed wheels in a ratio of two to one mounted on said control lever, the teeth of one of said wheels having cam faces, a dog pivoted on said trip lever and engaging one of said wheels, a second dog pivoted on said first named dog and engaging the other wheel, said control lever having a notch to receive said second dog during one movement of said trip lever and the cam surfaces of one of said wheels holding said second dog out of engagement with said notch during the alternate movement of said trip lever.

4. The combination, with a control lever and steering wheel and throttle and a locking latch for said lever and means for throwing said lever to its high-speed position when said latch is released, a line control mechanism connected with said line control and with said lever for tripping said latch on the initial movement of said line control and allowing said lever to move to its high-speed position, said mechanism on the second movement of said line control returning said lever to its neutral position and means connecting said lever with the throttle for closing it upon the movement of said lever to its neutral position.

5. The combination, with a control lever, its locking latch and means for throwing said lever to its high-speed position when said latch is released, of a bracket mounted on said lever, a trip lever pivoted on said bracket for releasing said locking latch, a line control connected with said trip lever and mechanism interposed between said trip lever and said bracket for alternately allowing said trip lever to oscillate and release said latch or locking it on said bracket to move said lever from its high speed to its neutral position.

6. The combination, with a control lever, its locking latch and means normally tending to throw said lever forward, of a trip lever, a line control connected with said trip lever and a ratchet mechanism interposed between said trip lever and said control lever for allowing said trip lever to swing independently of said control lever on the initial pull of said control line to trip said latch and lock said trip lever on the second pull of said line to move said control lever.

7. The combination, with a control lever and its locking latch, said lever, when released, normally moving to its high speed position, of a trip device, a line control connected with said trip device, and a mechanism for allowing said trip device to move independently of said control lever on the initial pull of said control line to trip said latch and lock said trip device on the second pull of said line to move said control lever.

8. The combination, with a control lever, its locking latch and means normally tending to throw said lever forward, of a trip device, a line control connected with said trip device, and a ratchet mechanism mounted to allow said trip device to swing independently of said control lever on the initial pull of said line and lock said trip device on the second pull of said line to move said control lever.

In witness whereof I have hereunto set my hand this 22nd day of June, 1918.

VITUS A. BOKER.

Witnesses:
A. J. ANDERSON,
M. H. KRONSCHNABLE.